(12) United States Patent
Pitt et al.

(10) Patent No.: US 6,829,227 B1
(45) Date of Patent: Dec. 7, 2004

(54) DUAL POLLING MEDIA ACCESS CONTROL PROTOCOL FOR PACKET DATA IN FIXED WIRELESS COMMUNICATION SYSTEMS

(75) Inventors: Randall Evans Pitt, Batavia, IL (US); David Warren Spears, Aurora, IL (US); Chokri Trabelsi, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 774 days.

(21) Appl. No.: 09/698,381

(22) Filed: Oct. 27, 2000

(51) Int. Cl.[7] .............................. H04J 3/16; H04Q 7/20
(52) U.S. Cl. ....................... 370/329; 370/348; 370/462; 455/452.2
(58) Field of Search ................................ 370/328–329, 370/336–337, 346–349, 449, 458–459, 462, 318; 710/109, 113, 117, 241, 244; 455/450–455

(56) References Cited

U.S. PATENT DOCUMENTS

| | | | |
|---|---|---|---|
| 5,596,577 A | * 1/1997 | Perreault et al. | 370/449 |
| 5,677,909 A | * 10/1997 | Heide | 370/347 |
| 5,751,708 A | * 5/1998 | Eng et al. | 370/395.42 |
| 6,192,026 B1 | * 2/2001 | Pollack et al. | 370/203 |
| 6,480,505 B1 | * 11/2002 | Johansson et al. | 370/449 |
| 6,542,495 B1 | * 4/2003 | Sugita | 370/347 |
| 2001/0038620 A1 | * 11/2001 | Stanwood et al. | 370/336 |
| 2003/0026219 A1 | * 2/2003 | Moon et al. | 370/318 |

OTHER PUBLICATIONS

Andrew S. Tanenbaum, *Computer Networks*, (3d. ed. 1996), pp. 243–250.

* cited by examiner

Primary Examiner—Hassan Kizou
Assistant Examiner—Gregory Sefcheck

(57) ABSTRACT

An apparatus, method and system are illustrated which provide a media access control polling protocol, using two types of polls, for packet data transmission in the uplink direction, in fixed wireless communication systems. The preferred system embodiment includes a plurality of subscriber units having transceivers for wireless communication, a base station having a transceiver for wireless communication with the plurality of subscriber units, and a data interface unit (DIU) operatively coupled to the base station through a network access controller. The DIU transmits a first poll, which authorizes transmission of a first predetermined amount of data, referred to as a standard allocation, for prompt throughput of small messages, such as acknowledgements. For subscriber units having additional data for transmission, the DIU transmits a second poll on a distinct or separate subchannel, which authorizes transmission of a second predetermined amount of data, referred to as an extended allocation, for transmission of larger blocks of data which are less delay-sensitive. In addition, power measurement is performed on all poll responses, to allow for transmission power level changes prior to and during data transmission, for greater data throughput.

37 Claims, 4 Drawing Sheets

100

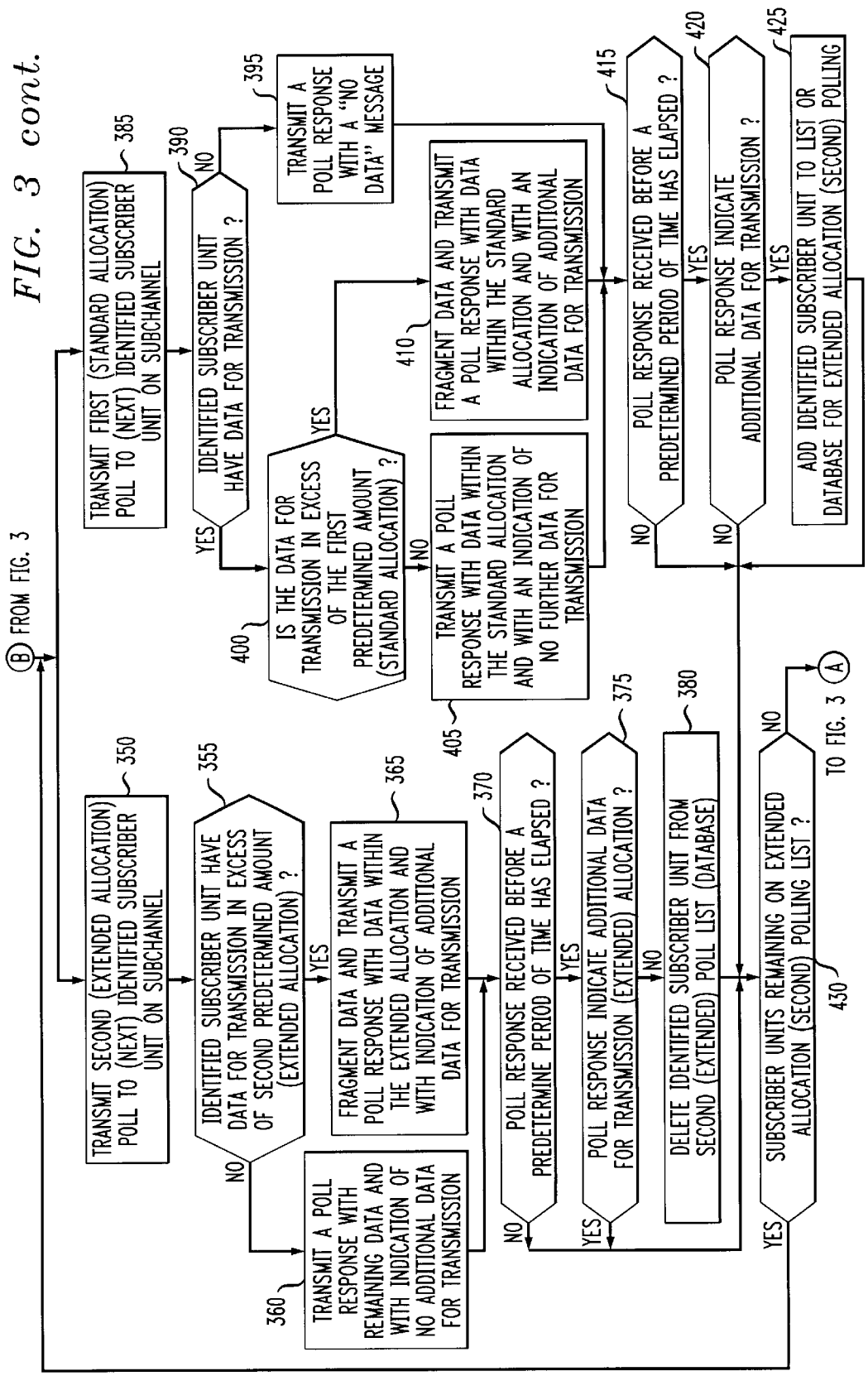

DUAL POLLING MEDIA ACCESS CONTROL PROTOCOL FOR PACKET DATA IN FIXED WIRELESS COMMUNICATION SYSTEMS

FIELD OF THE INVENTION

The present invention relates, in general, to packet data communication systems and, more specifically, to an apparatus, method and system for a dual polling media access control protocol for packet data in fixed wireless local loop CDMA-based communication systems.

BACKGROUND OF THE INVENTION

Fixed wireless communication systems are becoming increasingly viable solutions for providing local loop telecommunication network access, particularly in developing nations. The alternative, wireline local loop access, may be prohibitively expensive, with a sparse availability of wireline telecommunication systems operating as a constraint on economic development. As a consequence, telecommunication service providers are increasingly turning to wireless technologies, with or without wireline services, to implement a cost-effective local loop telecommunication service, for voice, data, and other multimedia uses.

A wireless local loop ("WLL") system typically includes a base station which transmits to and receives from various transceivers (within subscriber units) which are located at each home, business or other customer premises being served. The base station broadcasts to all the subscriber units it serves ("forward", "downlink" or "downstream" direction). The broadcast includes an identification of the intended subscriber unit, which then selects that broadcasted information for the particular customer premises. Similarly, when it has information to send, each subscriber unit transmits the information to the base station ("reverse", "uplink" or "upstream" direction). These upstream transmissions are typically separated by time (time division multiple access (TDMA)), frequency (frequency division multiple access (FDMA)), or code (code division multiple access (CDMA)), creating multiple channels which, to some degree, prevent the subscriber units from contending for the same resources. As all subscriber units are not anticipated to be constantly transmitting, for cost-effectiveness and other efficiency considerations, system providers may allocate system resources so that upstream channels are shared among multiple subscriber units, creating an inherent potential for conflict on each such shared upstream channel.

As a consequence, for packet data systems with a number of subscribers sharing the same radio or channel resources, a protocol is needed to resolve the potential contention among subscriber units for the available upstream channels. Existing CDMA-based packet radio systems utilize a random access media access control ("MAC") protocol, in which a transmission of a single data packet in a given time period is generally received correctly, while simultaneous transmission of an additional packet causes a collision, with all packets destroyed.

One such random access protocol is ALOHA (see, e.g., A. Tanenbaum, *Computer Networks* (3d. ed. 1996) at 246–50). When data arrives at the subscriber unit for upstream transmission, such as from a computer within the customer premises, it is transmitted immediately. When the base station receives an uncorrupted packet, the base station broadcasts an acknowledgement to the sender. If no acknowledgement is received, the transceiver "backs off" for a random period of time, and then retransmits the packet. If two or more transmissions overlap in time (collide), all are corrupted, and the base station does not acknowledge any of them. Another variant of ALOHA, slotted ALOHA, provides for upstream transmissions in unassigned time slots, but still has a significant probability of collisions within these time slots.

Most random access protocols, such as ALOHA and its variants, are inherently unstable, and statistical fluctuations may easily cause their saturation. These protocols tend to reach a situation in which the percentage of sources attempting to retransmit approaches one hundred percent, while the throughput approaches zero. In addition, with this inherent instability, a system with a random access protocol must be periodically reset to operate in its stable region of its throughput-channel traffic rate curve. As a consequence, while delay and throughput characteristics may be satisfactory in the short term, they are quite poor over a long period of time.

Additionally, protocols such as ALOHA require a very low loading to work with any efficiency. They require a small packet size, or the probability of collision becomes excessively high, and have a low maximum throughput (e.g., approximately 18%). In addition, there is no theoretical bound for transmission delay, especially for users with comparatively infrequent or small data transmissions.

Other protocols, which may be suitable for wireline or cable applications, are unsuitable for fixed wireless applications. For example, in Carrier Sense Multiple, Access (CSMA) and Digital Sense Multiple Access (DSMA), when a user has data to transmit, the transceiver looks for current activity on the selected channel, and if there is no activity, it transmits. For radio applications, this would rely upon time division duplexing, as corresponding transceivers (within subscriber units) would have to both transmit and receive on the same frequency. For fixed wireless applications, there is an additional difficulty because the transceivers are directional and cannot directly receive transmissions from other transceivers, making direct carrier sense impossible.

In DSMA, activity on the uplink (upstream) channel is broadcast by the a base station to the subscriber units on the downlink channel(s). As a consequence, the effectiveness of DSMA in preventing data collisions depends upon the accuracy of the sensing operation by the transceivers. In addition, there is a period of vulnerability, corresponding to the time required for the broadcast to be received by all subscriber units. During this period, other users may still perceive the channel as idle, start a transmission, and cause a collision.

Another difficulty for any desired protocol arises within CDMA-based communication systems, namely, power control. More specifically, any packet data protocol for use with CDMA requires power control over the various transceivers, to have the same received power at the base station, to avoid increased noise levels and interference with other transceivers. In circuit switched systems, such as CDMA-based voice telephony, upstream transmission is effectively continuous, for the entire duration of the communication session, allowing correspondingly continuous power measurement and power correction. In contrast, packet data transmission is generally bursty, with transceivers transmitting for a short duration, followed by no transmission, followed by another transmission burst, and so on. A mechanism is needed in a wireless protocol for dynamic power control, to account for highly variable transmission characteristics and to accommodate bursty traffic patterns.

As a consequence, a need remains for a deterministic protocol for upstream or uplink packet data transmission in a wireless local loop communication system. Such a protocol should have guaranteed maximum delay and minimum throughput characteristics. Such a protocol should provide for maximal throughput, with minimum delay, for delay-sensitive data packets. The various embodiments of the deterministic protocol should also provide power control, for fixed wireless transmission systems, during data transmission.

SUMMARY OF THE INVENTION

In accordance with the present invention, an apparatus, method and system are provided for a dual polling media access control ("MAC") protocol, which has guaranteed maximum delay and minimum throughput characteristics. The various embodiments of the deterministic protocol of the present invention also provide for power control, for fixed wireless transmission systems, both during data transmission and in between data transmissions. As a consequence, when data is transmitted, the initial power setting is approximately correct.

The preferred system embodiment includes a plurality of subscriber units, a base station having a transceiver for wireless communication with the plurality of subscriber units, and a data interface unit operatively coupled, through a network access controller, to the base station. The network access controller splits or divides the voice and data services provided to the subscriber. The voice services are directed to a public switched telephone network ("PSTN"), and data services are carried through a data interface unit (DIU) to a packet network, such as the Internet. Multimedia and other data packets are transmitted in a downstream or downlink direction, from a network, through the data interface unit, network access controller and base station to a subscriber unit, while data packets are transmitted in an upstream or uplink direction, from a subscriber unit, through the base station, network access controller and data interface unit, to the network.

The upstream and downstream directions operate -at different carrier frequencies using frequency division duplex ("FDD"). In each direction, a packet data channel is shared among a number of subscriber units using a MAC protocol, with the protocol of the present invention applicable to upstream transmissions. Each packet data channel is divided into two (or more) subchannels for both upstream and downstream communications. As discussed in greater detail below, to control potential conflict among subscriber units transmitting data in the upstream direction, the protocol of the present invention utilizes two types of polls (hence, "dual" polling), to resolve or avoid any potential contention between subscriber units in the upstream direction for the two or more subchannels. The first type of poll, referred to as a standard or first poll, is transmitted by the DIU (via the network access controller and base station) sequentially (round-robin) to each subscriber unit assigned to a given channel. In response to a standard poll, a subscriber unit may transmit data, up to a first predetermined number of bytes. If the subscriber unit has no data to transmit at that time, it transmits a "no data message" in the poll response. The first predetermined number of bytes allowed to be transmitted by a standard poll, the "standard allocation", is comparatively small, and is designed for prompt throughput of relatively small but delay sensitive messages, such as acknowledgement messages. Following reception of a poll response with either a no data message or a data packet (not to exceed the standard allocation of data), or following a time out if no poll response is received, another standard poll is transmitted to the next subscriber unit assigned to the channel, and so on, in round-robin fashion. By limiting the amount of data that can be transmitted in response to a standard poll, and thereby limiting the amount of time that a given channel is used by a given subscriber unit, the present invention provides the means to rapidly poll all the subscribers and allow the transmission of many short messages from multiple subscribers. In addition, by having each subscriber unit transmit on a regular basis, transmitting either data in a poll response or a no data message, power control is facilitated, as discussed in greater detail below.

If the subscriber unit has additional information to transmit, i.e., more information than the first predetermined number of bytes allowed in the standard allocation, then along with its standard allocation of data, the subscriber unit includes such an indication in. its poll response, such as through a flag or parameter indicating additional (stored) data remaining for transmission. In addition to standard polls, a second type of poll, referred to as an extended poll, is then transmitted sequentially (round-robin) to the subset of subscriber units having such additional data to transmit, preferably on-one selected subchannel (of the two or more available subchannels). In response to an extended poll, a subscriber unit may transmit data, up to a second predetermined number of bytes. The second predetermined number of bytes allowed to be transmitted by an extended poll, the "extended allocation", is comparatively large, and is designed for significant throughput of comparatively large but not delay sensitive messages, such as email messages, attachments and other file uploads. In the preferred embodiment, the extended allocation is 1550 bytes, compared to the standard allocation of 256 bytes. In addition, while receiving extended polls allowing upstream transmission of an extended allocation, the subset of subscriber units is also receiving standard polls, allowing additional upstream transmission of smaller size data packets as well.

As a subscriber unit receives these various standard polls and extended polls, it divides or fragments the data it has for transmission, in order to transmit the appropriate amount authorized by the given type of poll, until it has no further data for transmission. Conversely, the subscriber unit may also aggregate several smaller data packets to transmit the maximum amount authorized by a given poll. The fragmentation or aggregation of data for transmission is variable, depending upon any given received sequence of standard or extended polls, with corresponding amounts of data fragmented or aggregated for transmission in a poll response. For example, depending upon the status of the various extended and standard polling lists at any particular time, a given subscriber unit may receive a standard poll, followed by an extended poll, followed by one standard poll and one extended poll, with corresponding fragmentations or aggregations of one small block of data, one larger block of data, one small block of data and one larger block of data.

Improved power control is also a significant feature of the present invention. Following synchronization and signal acquisition bits, in the preferred embodiment, each response to standard or extended polls includes a preamble for power measurement to perform power control. During reception of the response, power measurement is performed at the base station. Any needed changes in power levels are determined immediately, with a power control message transmitted by the base station to the subscriber unit on a downlink channel, in time for the power control to take effect prior to transmission of a data payload in the same response message. (The no data message itself is utilized for power measurement and, as a consequence, does not include a separate power measurement preamble.) In addition, based upon power control instructions from previous responses to standard polls, any given subscriber unit has a recent estimate of appropriate power levels, for use in response to either another standard poll or an extended poll, increasing the probability of a successful, uncorrupted transmission. Such power control is particularly useful for the preferred embodiment utilizing CDMA for wireless transmission.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
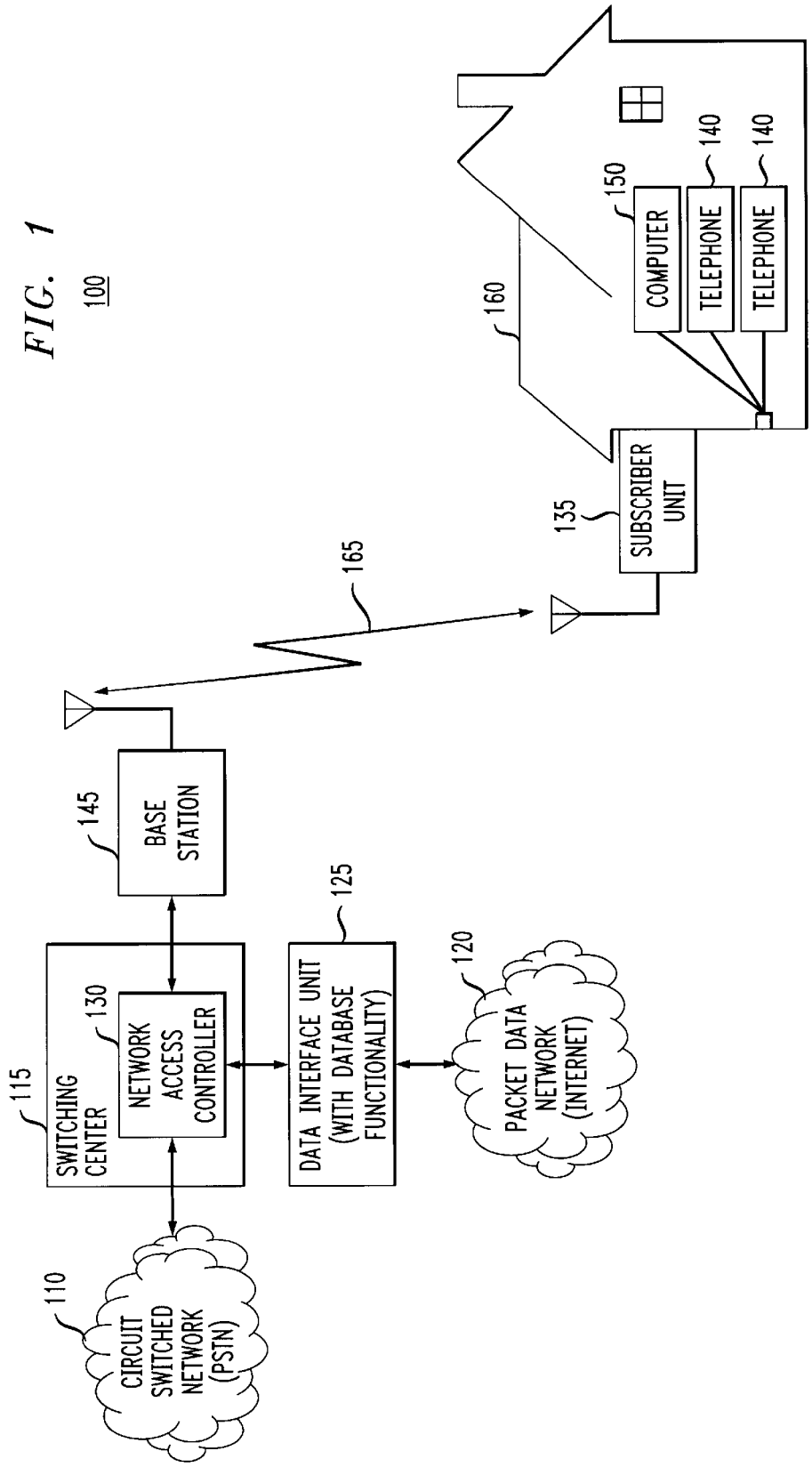
FIG. 1 is a block diagram illustrating a system embodiment for a dual polling media access control protocol in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for a deterministic protocol for upstream or uplink packet data transmission in a wireless local loop communication system. In accordance with the present invention, an apparatus, method and system are provided for a dual polling media access control ("MAC") protocol, which has guaranteed maximum delay and minimum throughput characteristics. The various embodiments of the present invention also provide for dynamic power control, for fixed wireless transmission systems,, such as CDMA-based systems.

As discussed in greater detail below, to control potential conflict among subscriber units transmitting data in the upstream direction, the protocol of the present invention utilizes two, types of polls (hence, "dual" polling). The first type of poll, referred to as a standard poll, is transmitted sequentially (round-robin) to each subscriber unit assigned to a given channel. In response to a standard poll, a subscriber unit may transmit data, up to a first predetermined number of bytes. If the subscriber unit has no data to transmit at that time, it transmits a no data message in response to the standard poll. The first predetermined number of bytes allowed to be transmitted by a standard poll, the "standard allocation", is comparatively small, and is designed for prompt throughput of relatively small but delay sensitive messages, such as acknowledgement messages. Following reception of a no data message or a standard allocation data packet, or following a time out if no message or data is received, another standard poll is transmitted to the next subscriber unit, and so on, in round-robin fashion. By limiting the amount of data which can be transmitted in response to a standard poll, and thereby limiting the amount of time that a given channel is used by a given subscriber, the present invention provides the means to rapidly poll all the subscribers and allow the transmission of many short messages from multiple subscribers.

If the subscriber unit has additional information to transmit, i.e., more information than the first predetermined number of bytes allowed in the standard allocation, the subscriber unit so indicates in its standard allocation data packet transmitted in response to the standard poll. In addition to standard polls, a second type of poll, referred to as an extended poll, is then transmitted sequentially (round-robin) to the subset of subscriber units having such additional data to transmit. In response to an extended poll, a subscriber unit may transmit data, up to a second predetermined number of bytes. The second predetermined number of bytes allowed to be transmitted by an extended poll, the "extended allocation", is comparatively large, and is designed for significant throughput of comparatively large but not delay sensitive messages, such as email messages, attachments and other file uploads. In the preferred embodiment, the extended allocation is 1550 bytes, compared to the standard allocation of 256 bytes. In addition, while receiving extended polls allowing upstream transmission of an extended allocation, the subset of subscriber units is also receiving standard polls, allowing upstream transmission of a standard allocation as well.

In the preferred embodiment, when extended polls are transmitted on one subchannel to a subset of subscriber units, referred to as an extended allocation subchannel, standard polls continue to be transmitted to all subscriber units on the other subchannel, referred to as a standard allocation subchannel. This use of separate subchannels for different types of polls by the present invention is a significant departure from prior art protocols which poll on a single channel, where use of an extended poll for larger blocks of data would introduce significant delay. In contrast, the present invention provides standard polls and maintains a minimal delay for short packets on one subchannel, while simultaneously providing extended polls for comparatively large packets on another subchannel. As a consequence, all subscriber units then have a guaranteed, minimum throughput for delay-sensitive messages, independently of system loading, namely, even while other subscribers may be transmitting comparatively large amounts of data. In addition, in contrast to existing implementations of the PPP Multilink Protocol ("MP"), fragmentation of large amounts of data for transmission or aggregation of small amounts of data for transmission is determined dynamically, and is variable, and is driven in response to the potentially varying sequence of reception of standard and extended polls, as discussed in greater detail below. In addition, sequential fragments of data may be transmitted on the same subchannel or link, in contrast with other protocols such as MP which require that transmitted data be alternatingly divided across all (both) the links or channels.

Improved power control is also a significant feature of the present invention. Following synchronization and signal acquisition bits, in the preferred embodiment each response to standard or extended polls includes a preamble for power measurement to perform power control. During reception of the response, power measurement is performed at the base station. Any needed changes in power levels are determined, with a power control message transmitted to the subscriber unit on a downlink channel, in time for the power control to take effect prior to transmission of a data payload (or a no data indication) in the same response message. In addition, based upon power control instructions from previous responses to standard polls, such as no data messages or poll responses, any given subscriber unit has a recent estimate of appropriate power levels, for use in response to either another standard poll or an extended poll, increasing the probability of a successful, uncorrupted transmission. Such power control is particularly useful for the preferred embodiment utilizing CDMA for wireless transmission.

Because this polling protocol is a deterministic network access technique, the various embodiments of the present invention do not have the stability problems of random access or contention access systems. In addition, the potential for high message delay in typical polling protocols is solved by the dual polling of the present invention, utilizing comparatively small bandwidth standard allocations, providing an upper bound to any maximum delay in access. At the same time, while minimizing system delay, the present invention provides significant data throughput. The protocol of the present invention is also particularly useful for fixed wireless applications, without requiring the carrier sense or collision detection needed in other systems.

FIG. 1 is a block diagram illustrating a system embodiment 100 to provide a dual polling MAC protocol for fixed wireless telecommunication systems in accordance with the present invention. The system 100 includes a switching center 115, which may be a mobile switching center or a wireline switching center, and which may also be connected via trunk and signaling lines (e.g., T1/E1) to other, additional switching centers and, through a network access controller 130, to a broader circuit-switched network 110, such as to a public switched telephone network ("PSTN"), providing multiple telecommunication connections to other locations, locally and globally. Through the network access controller 130, switching center 115 is also connected to a data interface unit 125, for packet data communication with a packet (packet-based or packet switched) network 120, such as the Internet. The network access controller 130 effectively divides or splits voice and data services, directing voice services to the (circuit-switched) network (PSTN) 110, and directing data (via DIU 125) to a packet network (Internet) 120. While illustrated as separate entities or devices, both the network access controller 130 and the data interface unit 125 may be included within the switching center 115, and may operate as platforms or applications within the switching center 115.

The DIU 125 implements the dual polling protocol of the present invention, transmitting (via network access controller and/or base station 145) standard and extended polls to subscriber units 135, and receiving corresponding responses, with the base station 145 providing power control, as mentioned above and as discussed in greater detail below. In the preferred embodiment, the DIU 125 also includes database functionality, to maintain lists of all subscriber units 135 assigned to a given channel for standard-polling, and to maintain lists of (subsets) of all subscriber units assigned to a given channel (or subchannel) for extended polling. Alternatively, the database functionality may be implemented utilizing a stand-alone database, or may be incorporated within other databases utilized, for example, by the switching center 115. The implementation of the dual polling protocol and operation of the DIU 125 in accordance with the present invention is discussed in greater detail below.

In addition to performing the dual polling protocol of the present invention, the DIU 125 provides an interface between the network access controller 130 and various Internet Service Providers ("ISPs") within the packet network 120, typically via an Ethernet interface. For example, the DIU 125 establishes appropriate tunnels, such as through Layer 2 Tunneling Protocol (L2TP), to various ISPs or other end points, and routes PPP connections from each subscriber to the correct tunnel.

The switching center 115 is also connected via trunk and signaling lines to one or more base stations 145 (which further include transceivers, not separately illustrated). The base stations 145 provide for bidirectional (full duplex) fixed wireless communication, via air interface 165, with a wireless transceiver within a corresponding subscriber unit 135, located at one or more premises 160, such as a home, business or other customer premises.

Within the premises 160, one or more telephones 140, computers 150 or other customer premise equipment are connected, via jacks or other couplings, to the subscriber unit 135, for bidirectional (full duplex) fixed wireless voice and data communications, to and from base station 145, and via network access controller 130 (within switching center 115) and data interface unit 125, to and from the various circuit-switched and packet-switched networks 110 and 120, respectively. The subscriber unit 135 operates for both voice and data transmission (e.g., as a wireless modem for data transmission), and supports PPP-based dial-up access to Internet Service Providers ("ISPs") and enterprise networks. As mentioned above, wireless transmission from the subscriber unit 135 to the base station 145 is referred to herein as the uplink or upstream direction, while wireless transmission from the base station 145 to the subscriber unit 135 is referred to herein as the downlink or downstream direction. As the data interface unit 125, the network access controller 130 and base station 145 provide and thereby control all downstream transmissions to all subscriber units 135, the present invention is primarily concerned with providing a means to control, and avoid interference and conflict (collisions) between, upstream (uplink) transmissions from the various subscriber units 135 to the base station 145.

Various radio or other wireless technologies may be utilized for the air interface 165. In the preferred embodiment, CDMA-based technology is utilized, in which traffic is conveyed by designated logical channels, utilizing codes. In the preferred embodiment, frequency division is also utilized, in which two separate frequency bands or channels are utilized for uplink and downlink transmissions. In turn, for data transmission, each of these uplink and downlink channels is further divided into two (or more) subchannels. Other technologies used for the air interface 165 include IS-95, DECT, PHS, PACS, and TDMA. Additional channels, at additional frequencies or time slots, or using additional codes, may be added based upon subscriber needs, up to a total capacity of the air interface 165, and based upon a partition between voice and data users. In addition, the transmission rates for the downlink and uplink may be symmetric or asymmetric (e.g., downlink rate higher than the uplink rate).

As a consequence, for purposes of the present invention, the air interface 165 includes at least one channel for data transmission and reception (a "packet" channel), which is preferably divided into a separate channel for downlink transmission, and a separate channel for uplink transmission (each of which is preferably further divided into at least two separate subchannels). At any given time, depending upon the loading of the system 100, multiple subscriber units 135 may be assigned to and will share the same packet channel and subchannels, resulting in a potential for interference with each other for upstream communications which is addressed by the present invention. In addition, other subscriber units 135 may also be assigned to and will share other packet channels and subchannels, also resulting in a potential for interference with each other for upstream communications, and which is similarly addressed by the application of the protocol of the present invention to those packet channels and subchannels.

In the downlink (forward direction from DIU 125 to subscriber unit 135), packets are broadcast, with multilink PPP used to recombine data divided over the two or more subchannels. Each subscriber unit 135 identifies packets intended for it, using an identification embedded in an appropriate downlink protocol. The DIU 125 terminates this downlink protocol, with no processing of the packet data performed within the network access controller 130.

In the uplink (reverse direction from the subscriber unit 135 to the DIU 125), the two subchannels are shared by the subscriber units 135 dynamically, with one subchannel assigned to one subscriber unit 135 for data transmission at one time, in accordance with the present invention, as discussed in greater detail below. In addition, a multilink protocol is also used in the uplink to recombine data divided or split across and within each subchannel. As mentioned above, such data fragmentation (or aggregation) is variable and dynamic, based upon any given sequence of reception of standard and extended polls, in accordance with the present invention.

The capacity of the air interface 165 may be divided by time, frequency or code, and in the preferred embodiment is divided by frequency and code, into various channels and subchannels, which are further partitioned for voice and data applications, referred to as voice channels or packet channels, respectively. Any given packet channel is determined by one or more particular codes, and is further divided, preferably by frequency, for a separate downlink channel (frequency band) and a separate uplink channel (frequency band). The packet channel is further divided into two subchannels for both uplink and downlink. In the preferred embodiment, an additional channel (a "registration channel") is also partitioned and utilized, in the uplink direction, for subscriber units 135 to notify (or register with) the DIU 125 to indicate that a data application is being initiated by, for example, a computer 150 and, therefore, the subscriber unit 135 should be assigned a packet channel and added to the database or list for standard polling. In the preferred embodiment, the DIU 125 then assigns the subscriber unit 135 to a packet channel currently having the lightest load, and adds that subscriber unit 135 to its standard polling list for that assigned channel. In the preferred embodiment, the subscriber unit 135 monitors both downlink subchannels of the assigned channel for a poll message addressed to it from the DIU 125, and any packets for transmission from the computer 150 (or other network device) are queued.

As there are two (or more) subchannels in the downlink in the preferred embodiment, two (or more) subscriber units 135 may be polled simultaneously and independently by the DIU 125. The DIU 125 cycles in a fixed order through all subscriber units assigned to a given packet channel, providing a standard poll to each in turn. Once a subscriber unit 135 has received a standard poll: (1) if it has no data to transmit, it transmits a short no data poll response message, so that the DIU 125 may immediately poll the next subscriber unit 135, rather than waiting a predetermined amount of time (timing out) before polling the next subscriber unit 135; or (2) if the subscriber unit 135 has data to transmit, by the standard poll, it has automatically been given the standard allocation of a first predetermined number of bytes for transmission, and may immediately transmit an amount of data up to the standard allocation. The subscriber unit 135 may fragment a larger block of data to transmit an amount of data within the standard allocation, or may aggregate several smaller packets of data to fully utilize the standard allocation. Given a data transmission rate, the standard allocation of a first predetermined number of bytes also corresponds to a duration of time (or holding time) during which the first predetermined number of bytes are transmitted on the packet channel, which is referred to herein as a standard allocation time. As mentioned above, if the subscriber unit 135 has additional data to transmit (i.e., more than the standard allocation), it so indicates in its response message (such as by setting a buffer size flag, discussed below), so that it may be added by the DIU 125 to a database or list for extended polls.

A poll message is sent over the downlink from the DIU 125 to a subscriber unit 135 over one subchannel. Following synchronization and signal acquisition bits (e.g., for CDMA), the poll message is defined as POLL (SUBSCRIBER UNIT#, Holding_Time). The first field, SUBSCRIBER UNIT#, identifies the subscriber unit 135 being polled. The second field, Holding_Time, is the maximum amount of time during which the identified subscriber unit 135 may hold (or seize) the assigned subchannel to transmit any buffered data (without shutting off its transmitter). As mentioned above, for a given data rate, the holding time corresponds to the amount of data which the subscriber unit 135 may transmit at that time, in response to the poll, with a standard holding (or allocation) time corresponding to transmission of the first predetermined number of bytes, such as a standard allocation of 256 bytes, and with an extended holding (or allocation) time corresponding to transmission of the second predetermined number of bytes, such as the extended allocation of 1550 bytes.

The standard poll and the extended poll, therefore, differ based upon the holding time parameter included in the poll message of the preferred embodiment. The various holding times (standard and extended allocations) may be empirically determined or modeled, depending upon the air interface 165 implementation and the nature of the data traffic. Without hardware constraints, in the preferred embodiment, a standard allocation of 256 bytes is preferable, but may also be determined to be the size of smaller packets, such as the size of TCP control packets, within the scope of the present invention.

In the preferred embodiment, response messages containing data (transmitted from the subscriber unit 135 to the base station 145), in addition to having synchronization and signal acquisition bits, further include a power measurement preamble, for power control measurement by the base station 145. The length (and corresponding duration) of the power measurement preamble depends upon the minimum amount of time, for a given system 100 implementation, to implement power control for a CDMA air interface 165 (in the preferred embodiment) or another applicable air interface 165. Also in the preferred embodiment, response messages indicating no data for transmission do not include a power measurement preamble (with power measurement performed directly on the response message in its entirety, instead of on a preamble portion of a response message).

A poll response message is transmitted from the subscriber unit 135 to the DIU 125 (via the base station 145) on the assigned uplink channel regardless of whether the subscriber unit 135 has data to transmit or not. Following synchronization and signal acquisition bits and the power measurement preamble, the poll response message is defined as POLLR(SUBSCRIBER UNIT#, BUFFER_SIZE_FLAG, PACKET_PAYLOAD). As indicated above, the first field, SUBSCRIBER UNIT#, identifies the subscriber unit 135 which is responding to a poll. The second field, BUFFER_SIZE_FLAG, is used to indicate whether the identified subscriber unit has additional data for transmission, beyond or greater than what may be transmitted during the given allocation (either standard or extended). For example, if the identified subscriber unit has received a standard poll, it will set the buffer size flag or parameter to high (equal to a binary one or a "high" bit) if it has data for transmission in excess of the standard allocation (of 256 bytes), and will set the buffer size flag or parameter to low (equal to a binary zero or a "low" bit) if it has no data for transmission or has data for transmission less than or equal to the standard allocation (of 256 bytes). Continuing with the example, if the identified subscriber unit has received an extended poll, it will set the buffer size flag or parameter to high (equal to a binary one or a "high" bit) if it has data for transmission in excess of the extended allocation (of 1550 bytes), and will set the buffer size flag or parameter to low (equal to a binary zero or a "low" bit) if it has data for transmission less than or equal to the extended allocation (of 1550 bytes).

The third field of the poll response message, PACKET_PAYLOAD, is utilized for data transmission (or possibly also for indicating that the subscriber unit has no data for transmission). The data for transmission is included within this field, up to either the standard allocation, if the response is to a standard poll, or the extended allocation, if the response is to an extended poll. If the identified subscriber unit has no data for transmission, to form a no data message, it will so indicate in the second field (with a buffer size flag or parameter), or include a no data indicator in the third field.

In addition, the overhead for power measurement is unnecessary, and may be omitted, for a no data message (no data poll response). If the no data poll response message is corrupted during transmission due to a lack of power control, at the end of the standard allocation time period, the DIU 125 will time out and poll the next subscriber unit 135.

As mentioned above, standard polling proceeds round-robin, using both (or all) subchannels of the downlink portion of a packet channel, sequentially polling all subscriber units 135, until an identified subscriber unit 135 indicates during a cycle that it has more data to send (buffer size flag or parameter is set to high). When this occurs, the DIU 125, in the preferred embodiment, reserves one of the uplink subchannels for extended polling (as an "extended allocation" subchannel), and adds the identified subscriber unit to a database or list for such extended polling. Standard polling continues on the other uplink subchannel (the "standard allocation" subchannel), with extended polling commencing on the extended allocation subchannel. Selection of which subchannel becomes either the extended allocation subchannel or the standard allocation subchannel may be either predetermined (fixed), or may be dynamically determined. Depending upon the desired implementation, standard and extended polling may be provided on more than two subchannels.

For example, a first subchannel may be designated as a standard allocation subchannel only, while a second subchannel may be designated as either a standard allocation subchannel or an extended allocation subchannel. Standard polling commences on both subchannels for all subscriber units 135, and continues until an identified subscriber unit 135 has more data for transmission than the allotted standard allocation (as indicated by the buffer size flag of the poll response message). At that time, the DIU 125 adds the identified subscriber unit 135 to its extended allocation database, and continues standard polling on the first subchannel for all subscriber units 135. Once a currently polled subscriber unit 135 finishes transmitting its poll response to a standard poll on the second subchannel, the second subchannel becomes the extended allocation subchannel, with the DIU 125 commencing extended polling on the second subchannel. Any additional subscriber units 135 that require extended allocation transmissions are added to the extended allocation database, and are provided extended polls on the second subchannel.

A subscriber unit 135 will remain on the extended polling list, until it indicates that it no longer requires an extended allocation, by setting the buffer size flag to an appropriate value, or by transmitting less data than allowed by the extended allocation. When this occurs, the identified subscriber unit is removed from the extended polling list (database). If the extended polling database is empty, indicating that no subscriber units 135 for the packet channel require extended allocations for data transmission, extended polling ceases, with standard polling recommencing on the second subchannel. Otherwise, extended polling continues on the second subchannel.

One additional mechanism of the DIU 125 for delay reduction in the dual polling protocol of the present invention is to interleave poll messages with data packets for downlink transmission, to reduce the time required for poll messages to reach the identified subscriber unit 135. Priority on the downlink is given to a polling message (having an approximate length of eight bytes). Data packets for transmission on the downlink channel, if greater than a predetermined number of bytes, are further subdivided or fragmented into subpackets for separate transmission on the downlink subchannels. Poll messages are then interleaved with the subpackets for transmission on the downlink.

Figure 2:
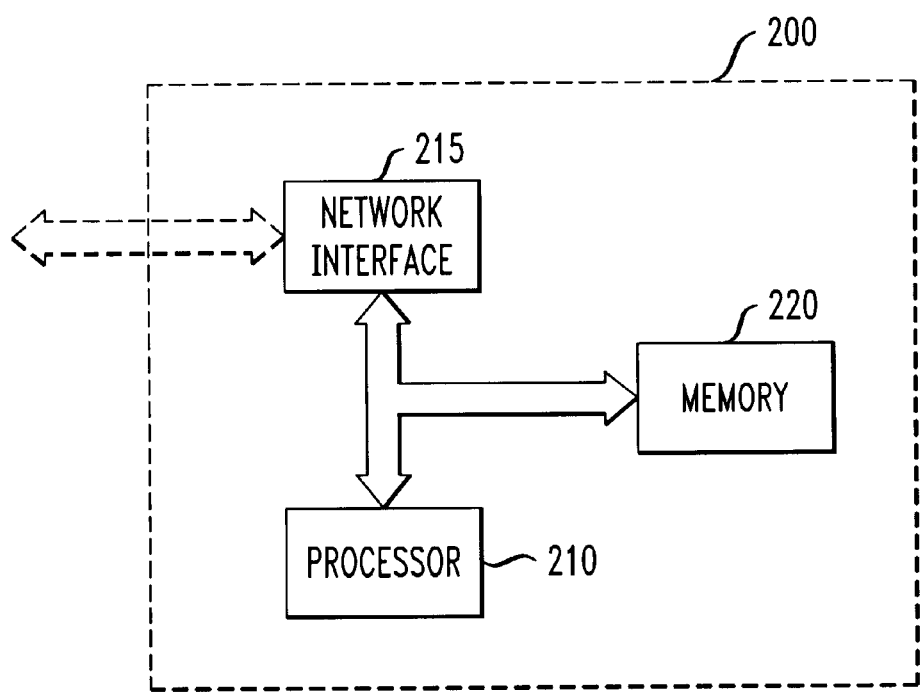
FIG. 2 is a block diagram illustrating an apparatus embodiment for a dual polling media access control protocol in accordance with the present invention.

FIG. 2 is a block diagram illustrating an apparatus embodiment 200 for a MAC dual polling protocol in accordance with the present invention. Such an apparatus 200 preferably may be included within a data interface unit 125 to perform the functions of a data interface unit 125 discussed above and as described below with reference to FIG. 3; alternatively, such an apparatus 200 may be included within a switching center 115, or distributed among a switching center 115 and a data interface unit 125. In addition, an apparatus 200 may be included within a subscriber unit 135 to perform the functions of a subscriber unit 135 discussed above and as described below with reference to FIG. 3. (Numerous other variations and equivalent embodiments will be readily apparent and are also within the scope of the present invention.) The apparatus 200 includes a processor 210, a network interface 215, and a memory 220. The network interface 215 is utilized to transmit (or receive) polls and receive data and other messages, such as control messages, poll responses, packet data, and other pertinent information. In the preferred DIU 125 embodiment, the network interface 215 is operatively coupled (via a network access controller 130) to a base station 145 for such transmission and reception to and from the subscriber units 135. In the subscriber unit 135 embodiment, the network interface 215 is operatively coupled to or includes an antenna for wireless communication with a base station 145. The memory 220 may be one or more integrated circuits (such as various forms of RAM), magnetic hard drives, optical storage devices, or any other type of data storage apparatuses. The memory 220 is used to store information pertaining to program instructions or configurations (discussed below), and for a DIU 125 embodiment, call management and other call information, such as subscriber profile information, and to store database information pertaining to the standard and extended polling lists of subscriber units 135, and for a subscriber unit 135 embodiment, to also store data for transmission. The memory 220 performs such information storage, and for a DIU 125 embodiment, may be included within a separate database integrated within a switching center 115 or DIU 125.

Continuing to refer to FIG. 2, the processor 210 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIG. 1, and also discussed in detail below with reference to FIG. 3, with associated memory, such as microprocessor memory or additional RAM, DRAM, SRAM, MRAM, ROM, EPROM or E²PROM. The processor 210 with its associated memory may be configured (via programming or hard-wiring) to perform the methodology of the invention, as discussed above with reference to FIG. 1 and as discussed below with reference to FIG. 3. For example, the methodology may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). Equivalently, when the processor 210 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 210 is implemented in its entirety as a microprocessor, which is programmed to implement the methodology of the invention.

Figure 3:
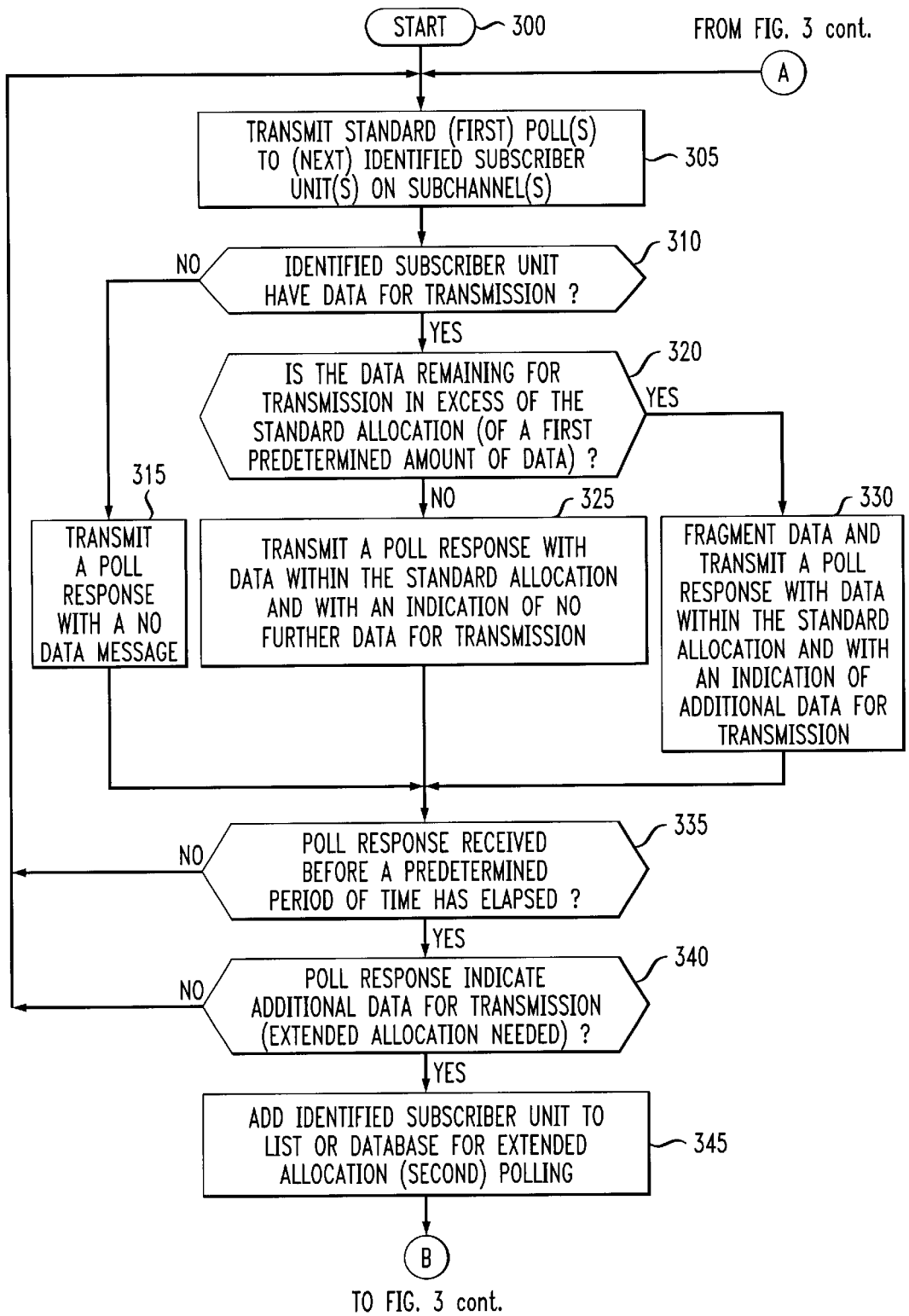
FIG. 3 is a block diagram illustrating a method embodiment for a dual polling media access control protocol in accordance with the present invention.

FIG. 3 is a block diagram illustrating a method embodiment for a dual polling MAC protocol in accordance with the present invention, and provides a useful summary. Beginning with start step 300, standard polling proceeds in a round-robin method, using both (or all) subchannels, granting each polled subscriber unit 135 a standard allocation time, step 305. The first (standard allocation) polling mode (of steps 305–345) operates in parallel, occurring on both subchannels simultaneously and independently, until second (extended allocation) polling may begin if needed (following step 345). When the identified subscriber unit 135 does not have data to transmit, step 310, the identified subscriber unit 135 transmits a poll response indicating that it has no data for transmission, step 315. When the identified subscriber unit 135 does have data to transmit, step 310, the identified subscriber unit 135 determines whether it has data in excess of a first predetermined amount, such as in excess of the standard allocation, step 320. When the identified subscriber unit 135 does not have data for transmission in excess of the first predetermined amount (the standard allocation), step 320, the identified subscriber unit 135 transmits a poll response containing all of its data for transmission and further indicating that it has no further data for transmission, either by setting a buffer size flag or parameter to an appropriate value or by using less than the full standard allocation, step 325. When the identified subscriber unit 135 does have data for transmission in excess of the first predetermined amount (the standard allocation), step 320, the identified subscriber unit 135 divides or fragments its data for transmission, determining a first fragment of data which is less than or equal to the first predetermined amount of data (i.e., within the standard allocation), transmits a poll response containing the first fragment of its data for transmission, and further indicates that it has further data for transmission, such as by setting a buffer size flag or parameter to an appropriate value, step 330.

Not separately illustrated in FIG. 3, as poll responses are transmitted in steps 315, 325 or 330, the base station 145 determines whether an adjustment of transmit power levels is necessary or advisable, and if so, transmits a power control message to the identified subscriber unit 135. As mentioned above, the power control message is transmitted out of band, on a separate downlink channel.

Following steps 315, 325 or 330, the method may time out if the DIU 125 has not received a poll response, step 335. More specifically, in step 335, when a poll response has been received before a predetermined period of time has elapsed, a timer (which commenced with the transmission of the standard poll in step 305) is stopped, and the method proceeds to step 340. If no poll response has been received by the DIU 125 prior to the expiration of the predetermined period of time in step 335, as indicated by the timer, the method "times out" and returns to step 305 to poll the next subscriber unit on the particular subchannel. (Not separately illustrated in FIG. 3, if the method times out for a particular subscriber unit 135 more than a predetermined threshold amount, for standard or extended polling, the subscriber unit 135 is dropped or removed from the standard (and/or extended) polling list(s) for the assigned subchannel.) When a poll response has been received by the DIU 125 prior to the expiration of the predetermined period of time in step 335, the DIU 125 determines whether the poll response indicates that the identified subscriber unit 135 has additional (or remaining) data for transmission (and requiring an extended allocation time), step 340, such as through the buffer size flag or parameter being set to an appropriate value. When the poll response indicates that the identified subscriber unit 135 does not have additional data for transmission (such that no extended allocation time is needed) in step 340, the DIU 125 returns to step 305 to transmit a first (standard allocation) poll the next subscriber unit on the particular subchannel. When the poll response indicates that the identified subscriber unit 135 has additional data for transmission (such that an extended allocation time is preferable) in step 340, the DIU 125 adds the identified subscriber unit 135 to its extended poll list or database, step 345, and begins extended allocation polling mode, proceeding to steps 350 and 385.

Continuing to refer to FIG. 3, and as mentioned above, extended allocation polling mode (steps 350–430) also operates on two parallel and independent paths, with standard allocation polling continuing on a first subchannel, steps 385–430, and with extended allocation polling commencing on a second subchannel, steps 350–380, separately and independently from the polling on the first subchannel.

For extended allocation polling, the DIU 125 transmits a second type of poll, an extended poll, to a (next) identified subscriber unit 135 from the extended polling. list or database, on one of the subchannels; such as the second or extended allocation subchannel, step 350. The identified subscriber unit 135 then determines whether it has data for transmission in excess of a second predetermined amount of data (i.e., the extended allocation), step 355. When the identified subscriber unit 135 does not have data for transmission in excess of the extended allocation (the second predetermined amount of data), step 355, the identified subscriber unit 135 transmits a poll response containing all of its data for transmission and further indicating that it has no further data for transmission (i.e., transmission is complete), either by setting a buffer size flag or parameter to an appropriate value or by using less than the full extended allocation, step 360. When the identified subscriber unit 135 does have data for transmission in excess of the extended allocation, step 355, the identified subscriber unit 135 again divides or fragments its data for transmission, determining a second (or next) fragment of data within the extended allocation, and transmits a poll response containing the second (or next) fragment of its data for transmission, and further indicates that it has further data for transmission, such as by setting a buffer size flag or parameter to an appropriate value, step 365.

It should be noted that as this method goes through repeated iterations, the fragmentation or aggregation of data for transmission is variable, depending upon any given received sequence of standard or extended polls, with corresponding amounts of data fragmented or aggregated for transmission in a poll response. In addition, also depending upon the received sequence of standard or extended polls, the various data packets within the poll responses may be variable split on one or more subchannels.

Also as mentioned above for standard polling, as poll responses to extended polls are transmitted in steps 360 or 365, the base station 145 determines whether an adjustment of transmit power levels is necessary or advisable, and if so, transmits a power control message to the identified subscriber unit 135, generally out of band, on a separate downlink channel.

Following steps 360 or 365, the method may time out if the DIU 125 has not received a poll response, step 370, as discussed above. More specifically, in step 370, when a poll response has been received before a predetermined period of time has elapsed, the method proceeds to step 375. If no poll response has been received by the DIU 125 prior to the expiration of the predetermined period of time in step 370, the method "times out" and proceeds to step 430. When a poll response has been received by the DIU 125 in step 370, the DIU 125 determines whether the poll response indicates that the subscriber unit 135 has additional data for transmission, such as by the buffer size flag or parameter being set to an appropriate value (or, conversely, whether the transmission has been completed and that an extended allocation time may no longer be needed by the identified subscriber unit 135, such as by the buffer size flag or parameter being set to an appropriate value or by the packet payload utilizing less than the extended allocation), step 375. When the poll response indicates that the identified subscriber unit 135 has additional data for transmission (i.e., transmission is incomplete and that an extended allocation time continues to be needed by the identified subscriber unit 135) in step 375, the DIU 125 proceeds to step 430. When the poll response indicates no additional data for transmission (i.e., that transmission is complete and that an extended allocation time is no longer needed by the identified subscriber unit 135) in step 375, the DIU 125 deletes the identified subscriber unit 135 from its extended poll list or database, step 380.

Following steps 375 or 380, or following a time out of step 370, the DIU 125 determines whether subscriber units 135 remain on the extended polling list, step 430, as various subscriber units 135 may have been added to or deleted from the extended polling list (steps 380 and 425). When there are subscriber units 135 remaining on the extended polling list in step 430, the DUI 125 returns to steps 350 and 385, to continue extended allocation polling mode. When there are no subscriber units 135 remaining on the extended polling list in step 430, the DUI 125 returns to step 305, to resume standard allocation polling mode.

During extended allocation polling mode, standard polls continue to be transmitted, for the most part identically to the methodology discussed above, except occurring generally on only one subchannel (when the embodiment utilizes only two subchannels). Beginning with step 385, the DIU 125 transmits a standard poll to a (next) identified subscriber unit 135, on one subchannel, such as on the first or standard polling subchannel. When the identified subscriber unit 135 does not have data to transmit, step 390, the identified subscriber unit 135 transmits a poll response indicating that it has no data for transmission, step 395. When the identified subscriber unit 135 does have data to transmit, step 390, the identified subscriber unit 135 determines whether it has data in excess of the standard allocation, step 400. When the identified subscriber unit 135 does not have data for transmission in excess of the standard allocation, step 400, the identified subscriber unit 135 transmits a poll response containing all of its data for transmission and further indicating that it has no further data for transmission, either by setting a buffer size flag or parameter to an appropriate value or by using less than the full standard allocation, step 405. When the identified subscriber unit 135 does have data for transmission in excess of the standard allocation, step 400, the identified subscriber unit 135 divides or fragments its data for transmission, determining a first fragment of data within the standard allocation, and transmits a poll response containing the first fragment of its data for transmission, and further indicates that it has further data for transmission, such as by setting a buffer size flag or parameter to an appropriate value, step 410.

Also as mentioned above, as poll responses to standard polls are transmitted in steps 395, 405 or 410, the base station 145 determines whether an adjustment of transmit power levels is necessary or advisable, and if so, transmits a power control message to the identified subscriber unit 135, also generally out of band, on a separate downlink channel.

Also as mentioned above, following steps 395, 405 or 410, the method may time out if the DIU 125 has not received a poll response, step 415. More specifically, in step 415, when a poll response has been received before a predetermined period of time has elapsed, the method proceeds to step 420. If no poll response has been received by the DIU 125 prior to the expiration of the predetermined period of time in step 415, the method "times out" and proceeds to step 430, as mentioned above, to either continue extended allocation mode polling or return to standard allocation mode polling.

When a poll response has been received by the DIU 125 in step 415, the DIU 125 determines whether the poll response indicates that the subscriber unit 135 has additional data for transmission (so that an extended allocation time may be needed by the identified subscriber unit 135), step 420, such as by the buffer size flag or parameter being set to an appropriate value. When the poll response indicates that the identified subscriber unit 135 has no further data for transmission in step 420, the DIU 125 proceeds to step 430, as mentioned above, to either continue extended allocation mode polling or return to standard allocation mode polling. When the poll response indicates that the identified subscriber unit 135 has additional data for transmission (such that an extended allocation time is needed by the identified subscriber unit 135) in step 420, the DIU 125 adds the identified subscriber unit 135 to its extended poll list or database, step 425, and also proceeds to step 430, either to continue extended allocation mode polling when subscriber units 135 remain on the extended polling list, or to return to standard allocation mode polling when no subscriber units 135 remain on the extended polling list.

Numerous advantages of the present invention may be apparent from the discussion above. First, the apparatus, method and system of the present invention provide a deterministic protocol for upstream or uplink packet data transmission in a wireless local loop telecommunication system. In accordance with the present invention, a dual polling media access control ("MAC") protocol is implemented, which has guaranteed maximum delay and minimum throughput characteristics. The various embodiments of the present invention provide for maximal throughput, with minimum delay, for delay-sensitive data packets. The various embodiments of the present invention also provide for dynamic power control, for fixed wireless transmission systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method of providing access to a wireless network for packet data transmission, the method comprising:

transmitting a first poll to an identified subscriber unit of the plurality of subscriber units, the first poll authorizing a responsive transmission of a first predetermined amount of data;

receiving a response to the first poll with a first fragment of data and with an indication of remaining data for transmission, the first fragment of data less than or equal to the first predetermined amount of data;

when a responsive transmission to the first poll is received with the indication of remaining data for transmission, transmitting a second poll to the identified subscriber unit, the second poll authorizing a responsive transmission of a second predetermined amount of data, the second predetermined amount of data greater than the first predetermined amount of data;

receiving a response to the second poll with a second fragment of data and with the indication of remaining data for transmission, the second fragment of data less than or equal to the second predetermined amount of data, and transmitting a response to the second poll with the second fragment of data;

wherein the transmission of the first poll occurs on a first subchannel and the transmission of the second poll occurs independently on a second subchannel.

2. The method of claim 1, wherein step (b) further comprises:

receiving the response to the first poll with the data for transmission and with an indication of no remaining data for transmission, when the data is less than or equal to the first predetermined amount of data.

3. The method of claim 1, further comprising:

receiving the data in the form of a plurality of separate data packets.

4. The method of claim 1, wherein step (b) further comprises:

receiving the response to the first poll with an indication of no data for transmission, when there is no data for transmission.

5. The method of claim 1, further comprising:

sequentially repeating step (a) for each identified subscriber unit of the plurality of subscriber units.

6. The method of claim 1, wherein step (d) further comprises:

receiving a response to the second poll with the data for transmission and with an indication of no remaining data for transmission.

7. The method of claim 6, further comprising:

(e) repeating steps (a) and (c) until the responsive transmission includes an indication that there is no remaining data for transmission.

8. The method of claim 1, further comprising:

sequentially repeating step (c) for each identified subscriber unit, of the plurality of subscriber units, which indicated remaining data for transmission.

9. The method of claim 1, wherein forming the first fragment of data or the second fragment of data further comprises aggregating a plurality of separate data packets.

10. The method of claim 1, wherein the response to the first poll and the response to the second poll include a power measurement preamble.

11. The method of claim 1, wherein the indication of remaining data for transmission is a predetermined field, set to a predetermined value, in the response to the first poll or the response to the second poll.

12. The method of claim 1, wherein the first predetermined amount of data is a first allocation of 256 bytes and the second predetermined amount of data is a second allocation of 1550 bytes.

13. A method of providing access to a wireless network for packet data, the method comprising:

transmitting a first poll to an identified subscriber unit of the plurality of subscriber units, the first poll authorizing a responsive transmission of a first predetermined amount of data;

receiving a response to the first poll with a first fragment of data and with an indication of remaining data for transmission, the first fragment of data less than or equal to the first predetermined amount of data;

when a responsive transmission to the first poll is received with the indication of remaining data for transmission, transmitting a second poll to the identified subscriber unit, the second poll authorizing a responsive transmission of a second predetermined amount of data, the second predetermined amount of data greater than the first predetermined amount of data;

receiving a response to the second poll with a second fragment of data and with the indication of remaining data for transmission, the second fragment of data less than or equal to the second predetermined amount of data, and transmitting a response to the second poll with the second fragment of data;

sequentially transmitting, on a first downlink channel, the first poll to each identified subscriber unit of the plurality of subscriber units, the first poll authorizing a responsive transmission of a first predetermined amount of data on a first uplink channel; and sequentially transmitting, on a second downlink channel, the second poll to each subscriber unit which indicated remaining data for transmission, of the plurality of subscriber units, the second poll authorizing a responsive transmission of the second predetermined amount of data on a second uplink channel.

14. A system for providing access to a wireless network for packet data transmission, the system operably couplable to a base station having a transceiver, the system comprising:

a data interface unit operatively couplable to the base station for wireless communication with a plurality of subscriber units, wherein the data interface unit when operative is configured to transmit a first poll to an identified subscriber unit of the plurality of subscriber units, the first poll authorizing a responsive transmission of a first predetermined amount of data; and when a responsive transmission to the first poll is received with an indication of remaining data for transmission, to transmit a second poll to the identified subscriber unit, the second poll authorizing a responsive transmission of a second predetermined amount of data, the second predetermined amount of data greater than the first predetermined amount of data;

wherein, the data interface unit when operative is configured to receive a response to the first poll with a first fragment of data and with the indication of remaining data for transmission; and further configured to receive a response to the second poll with a second fragment of data and with the indication of remaining data for transmission;

wherein the data interface unit is further configured to transmit the first poll on a first subchannel and independently transmit the second poll on a second subchannel.

15. The system of claim 14, wherein the data interface unit is further configured to receive the response to the first poll with the data for transmission and with an indication of no remaining data for transmission.

16. The system of claim 14, wherein the data interface unit is further configured to receive a plurality of separate data packets forming the data for transmission.

17. The system of claim 14, wherein the data interface unit is further configured to receive the response to the first poll with an indication of no data for transmission, when there is no data for transmission.

18. The system of claim 14, wherein the data interface unit is further configured to transmit the first poll sequentially to each identified subscriber unit of the plurality of subscriber units.

19. The system of claim 14, wherein the data interface unit is further configured to receive a response to the second poll with the data for transmission and with an indication of no remaining data for transmission.

20. The system of claim 14, wherein the data interface unit is further configured to transmit the first poll and the second poll to the identified subscriber unit it receives an indication that there is no remaining data for transmission.

21. The system of claim 14, wherein the data interface unit is further configured to transmit the second poll sequentially to each identified subscriber unit upon receiving a indication that there is remaining data for transmission.

22. The system of claim 14, wherein the data interface unit is further configured to receive the first fragment of data or the second fragment of data in the form of a plurality of separate data packets.

23. The system of claim 14, wherein the data interface unit is further configured to receive a power measurement preamble in the response to the first poll and in the response to the second poll.

24. The system of claim 14, wherein the data interface unit is further configured to receive an indication of remaining data for transmission as a predetermined field, set to a predetermined value, in the response to the first poll or the response to the second poll.

25. The system of claim 14, wherein the first predetermined amount of data is a first allocation of 256 bytes and the second predetermined amount of data is a second allocation of 1550 bytes.

26. The system of claim 14, wherein the data interface unit is further configured to maintain a database in a memory, the database identifying a first subset of the plurality of subscriber units for transmission of the first poll and a second subset of subscriber units for transmission of the second poll.

27. A system for providing access to a wireless network for packet data transmission, the system operably couplable to a base station having a transceiver, the system comprising:

a data interface unit operatively couplable to the base station for wireless communication with a plurality of subscriber units, wherein the data interface unit when operative is configured to transmit a first poll to an identified subscriber unit of the plurality of subscriber units, the first poll authorizing a responsive transmission of a first predetermined amount of data; and when a responsive transmission to the first poll is received with an indication of remaining data for transmission, to transmit a second poll to the identified subscriber unit, the second poll authorizing a responsive transmission of a second predetermined amount of data, the second predetermined amount of data greater than the first predetermined amount of data;

wherein, the data interface unit when operative is configured to receive a response to the first poll with a first fragment of data and with the indication of remaining data for transmission; and further configured to receive a response to the second poll with a second fragment of data and with the indication of remaining data for transmission;

wherein the data interface unit is further configured to transmit sequentially, on a first downlink channel of the base station, the first poll to each identified subscriber unit of the plurality of subscriber units, the first-poll authorizing a responsive transmission of a first predetermined amount of data on a first uplink channel; and to transmit sequentially, on a second downlink channel of the base station, the second poll to each subscriber unit which indicated remaining data for transmission, of the plurality of subscriber units, the second poll authorizing a responsive transmission of the second predetermined amount of data on a second uplink channel.

28. An apparatus for providing access to a wireless network for packet data transmission, the apparatus comprising:

a network interface operably couplable to a base station;

a memory, the memory storing a database having an identification of a first subset of subscriber units of a plurality of subscriber units for transmission of a first poll and having an identification of a second subset of subscriber units of the plurality of subscriber units for transmission of a second poll;

a processor operatively coupled to the network interface and to the memory, wherein the processor when operative is configured to transmit the first poll to an identified subscriber unit of the first subset of subscriber units, the first poll authorizing a responsive transmission of a first predetermined amount of data; and when a responsive transmission to the first poll is received with an indication of remaining data for transmission, to add the identified subscriber unit to the second subset of subscriber units in the database and to transmit the second poll to the identified subscriber unit, the second poll authorizing a responsive transmission of a second predetermined amount of data, the second predetermined amount of data greater than the first predetermined amount of data wherein the processor is further configured to transmit the first poll on a first subchannel and independently transmit the second poll on a second subchannel.

29. The apparatus of claim 28, wherein the processor is further configured to transmit the first poll sequentially to each identified subscriber unit of the first subset of subscriber units.

30. The apparatus of claim 28, wherein the processor is further configured to transmit the first poll and the second poll to an identified subscriber unit of the second subset of subscriber units, until the identified subscriber unit has indicated no remaining data for transmission, and when the identified subscriber unit has indicated no remaining data for transmission, to remove the identified subscriber unit from the second subset of subscriber units.

31. The apparatus of claim 28, wherein the processor is further configured to transmit the second poll sequentially to each identified subscriber unit of the second subset of subscriber units.

32. An apparatus for providing access to a wireless network for packet data transmission by a plurality of subscriber units, the wireless network including a base station having a transceiver for wireless communication with the plurality of subscriber units, the apparatus comprising:

a network interface operably couplable to the base station;

a memory, the memory storing a database having an identification of a first subset of subscriber units of the plurality of subscriber units for transmission of a first poll and having an identification of a second subset of subscriber units of the plurality of subscriber units for transmission of a second poll;

a processor operatively coupled to the network interface and to the memory, wherein the processor when operative is configured to transmit the first poll to an identified subscriber unit of the first subset of subscriber units, the first poll authorizing a responsive transmission of a first predetermined amount of data; and when a responsive transmission to the first poll is received with an indication of remaining data for transmission, to add the identified subscriber unit to the second subset of subscriber units in the database and to transmit the second poll to the identified subscriber unit, the second poll authorizing a responsive transmission of a second predetermined amount of data, the second predetermined amount of data greater than the first predetermined amount of data wherein the processor is further configured to transmit sequentially, on a first downlink channel of the base station, the first poll to each identified subscriber unit of the first subset of subscriber units, the first poll authorizing a responsive transmission of a first predetermined amount of data on a first uplink channel; and to transmit sequentially, on a second downlink channel of the base station, the second poll to each subscriber unit of the second subset of subscriber units, the second poll authorizing a responsive transmission of the second predetermined amount of data on a second uplink channel.

33. A method for providing access to a wireless network for packet data transmission by a subscriber unit, the method comprising:

(a) receiving a first poll, the first poll on a first subchannel authorizing a responsive transmission of a first predetermined amount of data;

(b) when the subscriber unit has data for transmission in excess of the first predetermined amount of data, dividing the data for transmission to form a first fragment of data, the first fragment of data less than or equal to the first predetermined amount of data, and transmitting a response to the first poll with the first fragment of data and with an indication of remaining data for transmission;

(c) when the subscriber unit has data for transmission in excess of the first predetermined amount of data, receiving a second poll, on a second subchannel the second poll authorizing a responsive transmission of a second predetermined amount of data, the second predetermined amount of data greater than the first predetermined amount of data; and (d) when the subscriber unit has data for transmission in excess of the second predetermined amount of data, dividing the data for transmission to form a second fragment of data, the second fragment of data less than or equal to the second predetermined amount of data, and transmitting a response to the second poll with the second fragment of data and with the indication of remaining data for transmission.

34. The method of claim 33, wherein step (b) further comprises:

when the subscriber unit has data for transmission which is not in excess of the first predetermined amount of data, transmitting the response to the first poll with the data for transmission and with an indication of no remaining data for transmission.

35. The method of claim 33, wherein step (b) further comprises:

when the identified subscriber unit has no data for transmission, transmitting the response to the first poll with an indication of no data for transmission.

36. The method of claim 33, wherein step (d) further comprises:

when the subscriber unit has data for transmission which is not in excess of the second predetermined amount of data, transmitting a response to the second poll with the data for transmission and with an indication of no remaining data for transmission.

37. The method of claim 33, wherein steps (b) and (d) further comprise:

when the subscriber unit has data for transmission, including a power measurement preamble in the response to the first poll or in the response to the second poll; and when a power control message is received, adjusting transmission power.

* * * * *